US012784673B2

(12) United States Patent
Cheng

(10) Patent No.: US 12,784,673 B2
(45) Date of Patent: Nov. 3, 2026

(54) PIXEL DRIVING CIRCUIT AND DRIVING METHOD THEREFOR, DISPLAY PANEL, AND DISPLAY DEVICE

(71) Applicants: Beijing BOE Technology Development Co., Ltd., Beijing (CN); BOE Technology Group Co., Ltd., Beijing (CN)

(72) Inventor: Hongfei Cheng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 180 days.

(21) Appl. No.: 18/857,880

(22) PCT Filed: Apr. 19, 2023

(86) PCT No.: PCT/CN2023/089141

§ 371 (c)(1),
(2) Date: Oct. 18, 2024

(87) PCT Pub. No.: WO2023/216823

PCT Pub. Date: Nov. 16, 2023

(65) Prior Publication Data

US 2026/0253536 A1 Aug. 27, 2026

(30) Foreign Application Priority Data

May 10, 2022 (CN) ......................... 202210505922.2

(51) Int. Cl.
*G09G 3/3225* (2016.01)

(52) U.S. Cl.
CPC ... *G09G 3/3225* (2013.01); *G09G 2300/0426* (2013.01); *G09G 2300/043* (2013.01); *G09G 2300/0852* (2013.01)

(58) Field of Classification Search
None
See application file for complete search history.

(56) References Cited

U.S. PATENT DOCUMENTS 11,127,346 B2 * 9/2021 Xuan .................. G09G 3/3233
2013/0043796 A1 * 2/2013 Ko ....................... G09G 3/3233
315/151

(Continued)

FOREIGN PATENT DOCUMENTS

CN 106205495 A 12/2016
CN 106504690 A 3/2017

(Continued)

OTHER PUBLICATIONS

The First Office Action mailed Dec. 18, 2024, in Chinese Application No. 202210505922.2, 15 pages including English translation.
International Search Report mailed on Jul. 29, 2023, received for PCT Application PCT/CN2023/089141, filed on Apr. 19, 2023, 4 pages including English Translation.
Written Opinion mailed on Jul. 29, 2023, received for PCT Application PCT/CN2023/089141, filed on Apr. 19, 2023, 10 pages including English Translation.

*Primary Examiner* — Sepehr Azari
(74) *Attorney, Agent, or Firm* — XSENSUS LLP

(57) ABSTRACT

A pixel driving circuit includes a driving circuit that is connected to a first node, a second node and a third node; a reset circuit that is connected to the third node, an initial signal end, a reset signal end, a fourth node, and a first gate driving signal end; a data writing circuit that is connected to the fourth node, a data signal end and a second gate driving signal end and is configured to transmit a signal of the data signal end to the fourth node in response to a signal of the second gate driving signal end; a first storage circuit that is connected between the first node and the fourth node; and a second storage circuit that is connected between the third node and the fourth node.

20 Claims, 4 Drawing Sheets

(56) References Cited

U.S. PATENT DOCUMENTS

| | | | | |
|---|---|---|---|---|
| 2015/0035448 | A1 | 2/2015 | Wang | |
| 2015/0154906 | A1* | 6/2015 | Chung | G09G 3/3233 345/212 |
| 2016/0125801 | A1 | 5/2016 | Chung et al. | |
| 2016/0232840 | A1* | 8/2016 | Tseng | G09G 3/3233 |
| 2017/0148387 | A1* | 5/2017 | Lin | G09G 3/3233 |
| 2017/0229070 | A1* | 8/2017 | Ma | G09G 3/32 |
| 2021/0166623 | A1* | 6/2021 | Gai | G09G 3/3233 |
| 2021/0201794 | A1* | 7/2021 | Xu | G09G 3/3291 |
| 2021/0210013 | A1* | 7/2021 | Lin | G09G 3/3233 |
| 2023/0013661 | A1* | 1/2023 | Beard | G09G 3/3233 |
| 2025/0279047 | A1* | 9/2025 | Wang | G09G 3/3208 |
| 2026/0155100 | A1* | 6/2026 | Kim | G09G 3/3233 |

FOREIGN PATENT DOCUMENTS

| | | | |
|---|---|---|---|
| CN | 111402807 | A | 7/2020 |
| CN | 113436581 | A | 9/2021 |
| CN | 113948534 | A | 1/2022 |
| CN | 114038419 | A | 2/2022 |
| CN | 114222615 | A | 3/2022 |
| CN | 114822362 | A | 7/2022 |
| KR | 20190018804 | A | 2/2019 |

* cited by examiner

PIXEL DRIVING CIRCUIT AND DRIVING METHOD THEREFOR, DISPLAY PANEL, AND DISPLAY DEVICE

CROSS-REFERENCE TO RELATED APPLICATIONS

The present application is a U.S. National Phase Application of International Application No. PCT/CN2023/089141, filed on Apr. 19, 2023, which claims the priority to the Chinese Patent Application No. 202210505922.2, entitled "PIXEL DRIVING CIRCUIT AND DRIVING METHOD THEREFOR, DISPLAY PANEL, AND DISPLAY DEVICE", filed on May 10, 2022, and the entire contents of both of which a incorporated herein by reference as part of the present application for all purposes.

TECHNICAL FIELD

The present disclosure relates to the field of display technologies and, in particular, to a pixel driving circuit and a driving method therefor, a display panel, and a display device.

BACKGROUND

A pixel driving circuit in a display panel generally includes a driving transistor. The threshold voltage of the driving transistor affects the magnitude of the output current of the driving transistor. Due to process problems, it is difficult to make the threshold voltages of the driving transistors in the display panel exactly the same. Thus, the display panel may have problems of uneven display brightness at the same gray scale.

It should be noted that the information disclosed in the above background section is only used for enhancing the understanding of the background of the present disclosure, and thus may include information that does not constitute prior art known to those ordinary skilled in the art.

SUMMARY

According to an aspect of the present disclosure, there is provided a pixel driving circuit. The pixel driving circuit includes a driving circuit, a reset circuit, a data writing circuit, a first storage circuit, and a second storage circuit. The driving circuit is connected to a first node, a second node and a third node, and is configured to input, according to a voltage difference between the first node and the third node, a driving current to the third node by using the second node. The reset circuit is connected to the third node, an initial signal end, a reset signal end, a fourth node, and a first gate driving signal end, and is configured to transmit a signal of the initial signal end to the third node in response to a signal of the reset signal end, and configured to connect the third node and the fourth node in response to a signal of the first gate driving signal end. The data writing circuit is connected to the fourth node, a data signal end and a second gate driving signal end, and is configured to transmit a signal of the data signal end to the fourth node in response to a signal of the second gate driving signal end. The first storage circuit is connected between the first node and the fourth node. The second storage circuit is connected between the third node and the fourth node.

In an exemplary embodiment of the present disclosure, the pixel driving circuit further includes a compensation circuit and a light-emitting control circuit. The compensation circuit is connected to the first node, the second node and a third gate driving signal end, and is configured to connect the first node and the second node in response to a signal of the third gate driving signal end. The light-emitting control circuit is connected to a first power supply end, the second node and an enable signal end, and is configured to transmit a signal of the first power supply end to the second node in response to a signal of the enable signal end.

In an exemplary embodiment of the present disclosure, the driving circuit includes a driving transistor, a first electrode of the driving transistor is connected to the second node, a second electrode of the driving transistor is connected to the third node, and a gate electrode of the driving transistor is connected to the first node, where the driving transistor is an N-type transistor.

In an exemplary embodiment of the present disclosure, the compensation circuit includes a second transistor, a first electrode of the second transistor is connected to the first node, a second electrode of the second transistor is connected to the second node, and a gate electrode of the second transistor is connected to the third gate driving signal end.

In an exemplary embodiment of the present disclosure, the reset circuit includes a third transistor and a fourth transistor. A first electrode of the third transistor is connected to the initial signal end, a second electrode of the third transistor is connected to the third node, and a gate electrode of the third transistor is connected to the reset signal end. A first electrode of the fourth transistor is connected to the third node, a second electrode of the fourth transistor is connected to the fourth node, and a gate electrode of the fourth transistor is connected to the first gate driving signal end.

In an exemplary embodiment of the present disclosure, the data writing circuit includes a fifth transistor, a first electrode of the fifth transistor is connected to the data signal end, a second electrode of the fifth transistor is connected to the fourth node, and a gate electrode of the fifth transistor is connected to the second gate driving signal end.

In an exemplary embodiment of the present disclosure, the first storage circuit includes a first capacitor, a first electrode of the first capacitor is connected to the first node, and a second electrode of the first capacitor is connected to the fourth node. The second storage circuit includes a second capacitor, a first electrode of the second capacitor is connected to the third node, and a second electrode of the second capacitor is connected to the fourth node.

In an exemplary embodiment of the present disclosure, the light-emitting control circuit includes a sixth transistor, a first electrode of the sixth transistor is connected to the first power supply end, a second electrode of the sixth transistor is connected to the second node, and a gate electrode of the sixth transistor is connected to the enable signal end.

In an exemplary embodiment of the present disclosure, the driving circuit includes a driving transistor, a first electrode of the driving transistor is connected to the second node, a second electrode of the driving transistor is connected to the third node, and a gate electrode of the driving transistor is connected to the first node. The compensation circuit includes a second transistor, a first electrode of the second transistor is connected to the first node, a second electrode of the second transistor is connected to the second node, and a gate electrode of the second transistor is connected to the third gate driving signal end. The reset circuit includes a third transistor and a fourth transistor. A first electrode of the third transistor is connected to the initial signal end, a second electrode of the third transistor is connected to the third node, and a gate electrode of the third transistor is connected to the reset signal end. A first electrode of the fourth transistor is connected to the third node, a second electrode of the fourth transistor is connected to the fourth node, and a gate electrode of the fourth transistor is connected to the first gate driving signal end. The data writing circuit includes a fifth transistor, a first electrode of the fifth transistor is connected to the data signal end, a second electrode of the fifth transistor is connected to the fourth node, and a gate electrode of the fifth transistor is connected to the second gate driving signal end. The first storage circuit includes a first capacitor, a first electrode of the first capacitor is connected to the first node, and a second electrode of the first capacitor is connected to the fourth node. The second storage circuit includes a second capacitor, a first electrode of the second capacitor is connected to the third node, and a second electrode of the second capacitor is connected to the fourth node. The light-emitting control circuit includes a sixth transistor, a first electrode of the sixth transistor is connected to the first power supply end, a second electrode of the sixth transistor is connected to the second node, and a gate electrode of the sixth transistor is connected to the enable signal end. The driving transistor, the second transistor, the third transistor, the fourth transistor, the fifth transistor, and the sixth transistor are N-type transistors.

According to an aspect of the present disclosure, there is provided a driving method for a pixel driving circuit, the driving method for the pixel driving circuit is used for driving the pixel driving circuit described above, and the driving method for the pixel driving circuit includes:

in a reset stage, inputting an active level to the reset signal end and the first gate driving signal end, and inputting an inactive level to the second gate driving signal end;

in a data writing stage, inputting an active level to the second gate driving signal end and the reset signal end, and inputting an inactive level to the first gate driving signal end;

and in a light-emitting stage, inputting an inactive level to the first gate driving signal end, the second gate driving signal end and the reset signal end.

According to an aspect of the present disclosure, there is provided a display panel. The display panel includes the pixel driving circuit described above.

According to an aspect of the present disclosure, there is provided a display device. The display device includes the display panel described above.

It should be understood that the above general description and the subsequent detailed description are merely exemplary and explanatory, and do not limit the present disclosure.

BRIEF DESCRIPTION OF THE DRAWINGS

The accompanying drawings herein, which are incorporated into and form a part of the specification, illustrate embodiments consistent with the present disclosure, and are used in conjunction with the specification to explain the principles of the present disclosure. It is apparent that the accompanying drawings in the following description are only some of the embodiments of the present disclosure, and that other accompanying drawings can be obtained based on these accompanying drawings without creative labor for those ordinary skilled in the art.

DETAILED DESCRIPTION

Figure 1:
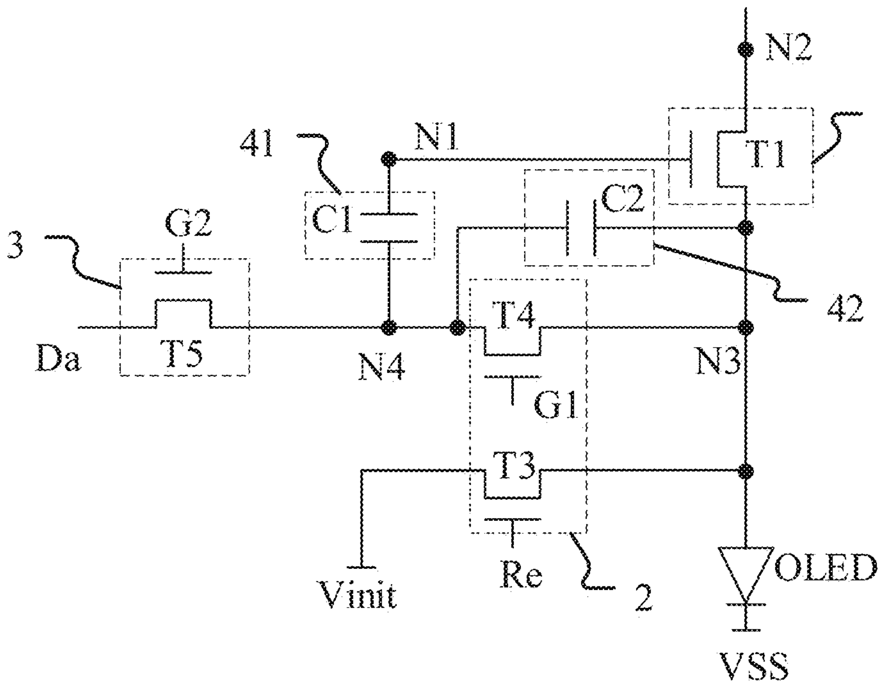
FIG. 1 is a schematic structural diagram of a pixel driving circuit in an exemplary embodiment of the present disclosure.

Exemplary embodiments are now described more comprehensively with reference to the accompanying drawings. However, the exemplary embodiments are capable of being implemented in a variety of forms, and should not be construed as being limited to the embodiments set forth herein. On the contrary, the provision of these embodiments allows for the present disclosure to be comprehensive and complete, and conveys the idea of the exemplary embodiments in a comprehensive manner to those skilled in the art. The same reference numerals in the drawings indicate the same or similar structures, and therefore their detailed descriptions will be omitted.

The terms “a”, “an” and “the” are used for indicating an existence of one or more elements/components/etc.; and the terms “include” and “have” are used for indicating an open-ended inclusion and mean that there may be additional elements/components/etc. in addition to the listed elements/components/etc.

The exemplary embodiments first provide a pixel driving circuit. As shown in FIG. 1, a schematic structural diagram of a pixel driving circuit in an exemplary embodiment of the present disclosure is shown. The pixel driving circuit may include a driving circuit 1, a reset circuit 2, a data writing circuit 3, a first storage circuit 41, and a second storage circuit 42. The driving circuit 1 is connected to a first node N1, a second node N2 and a third node N3, and is configured to input, according to a voltage difference between the first node N1 and the third node N3, a driving current to the third node N3 by using the second node N2. The reset circuit 2 is connected to the third node N3, an initial signal end Vinit, a reset signal end Re, a fourth node N4, and a first gate driving signal end G1, and is configured to transmit a signal of the initial signal end Vinit to the third node N3 in response to a signal of the reset signal end Re, and configured to connect the third node N3 and fourth node N4 in response to a signal of the first gate driving signal end G1. The data writing circuit 3 is connected to the fourth node N4, a data signal end Da and a second gate driving signal end G2, and is configured to transmit a signal of the data signal end Da to the fourth node N4 in response to a signal of the second gate driving signal end G2. The first storage circuit 41 is connected between the first node N1 and the fourth node N4. The second storage circuit 42 is connected between the third node N3 and the fourth node N4. In some embodiments, as shown in FIG. 1, the third node N3 may be configured to be connected to a first electrode of a light-emitting unit OLED, a second electrode of the light-emitting unit OLED may be connected to a second power supply end VSS, and the pixel driving circuit may be configured to drive the light-emitting unit OLED to emit light.

In the exemplary embodiment, the driving circuit 1 may include a driving transistor T1, and the driving method for the pixel driving circuit may include a reset stage, a threshold compensation stage, a data writing stage, and a light-emitting stage. In the reset stage, active levels may be input to the reset signal end Re and the first gate driving signal end G1, an inactive level may be input to the second gate driving signal end G2, the reset circuit 2 transmits the signal of the initial signal end Vinit to the third node N3 and the fourth node N4, and the voltage of the third node N3 and the voltage of the fourth node N4 are Vini, where Vini is the voltage of the initial signal end Vinit. In the threshold compensation stage, a threshold compensation voltage Vth+Vx may be input to the first node N1, where Vth is the threshold voltage of the driving transistor T1, Vx is a reference voltage, and the value of Vx may be adjusted according to the actual condition. In the data writing stage, active levels may be input to the second gate driving signal end G2 and the reset signal end Re, an inactive level may be input to the first gate driving signal end G1, the data writing circuit 3 transmits the data signal of the data signal end Da to the fourth node N4, the voltage of the fourth node N4 is changed from Vini to Vdata, where Vdata is the voltage of the data signal, under the coupling effect of the first storage circuit 41, the voltage of the first node N1 is changed to Vth+Vx+Vdata−Vini, at the same time, the reset circuit 2 transmits the signal of the initial signal end Vinit to the third node N3, and the voltage of the third node N3 is Vini. In the light-emitting stage, inactive levels may be input to the first gate driving signal end G1, the second gate driving signal end G2 and the reset signal end Re, the driving transistor T1 is turned on under the action of the voltage of the first node N1, thereby inputting a driving current to the third node N3, the voltage of the third node N3 is changed to V3, and under the coupling effect of the first storage circuit 41 and the second storage circuit 42, the voltage of the first node N1 is changed to Vth+Vx+Vdata−Vini+V3−Vini, according to the formula, $I=(\mu WCox/2L)(Vgs-Vth)^2$, of the output current of the driving transistor, where I is the output current of the driving transistor, μ is the carrier mobility, Cox is the electric capacity per unit area of the gate electrode, W is the width of the channel of the driving transistor, L is the length of the channel of the driving transistor, Vgs is the gate-source voltage difference of the driving transistor, and Vth is the threshold voltage of the driving transistor. In the exemplary embodiment, the output current from the driving transistor T1 to the third node N3 is:

$$
\begin{aligned}
I &= (\mu WCox/2L)(Vth + Vx + Vdata - Vini + V3 - Vini - V3 - Vth)^2 \\
&= (\mu WCox/2L)(Vx + Vdata - 2\,Vini)^2
\end{aligned}
$$

According to the formula of the output current of the driving transistor T1, it can be seen that in the exemplary embodiment, the output current of the pixel driving circuit is independent of the threshold voltage of the driving transistor, and the pixel driving circuit is capable of ameliorating the problem of uneven display of the display panel due to the inconsistency of the threshold voltages of the driving transistors.

It should be noted that in the exemplary embodiment, the active level refers to a level that is capable of driving the target circuit to work, and the inactive level refers to a level that is not capable of driving the target circuit to work, e.g., when the target circuit is an N-type transistor, the active level is a high level, and the inactive level is a low level.

Figure 2:
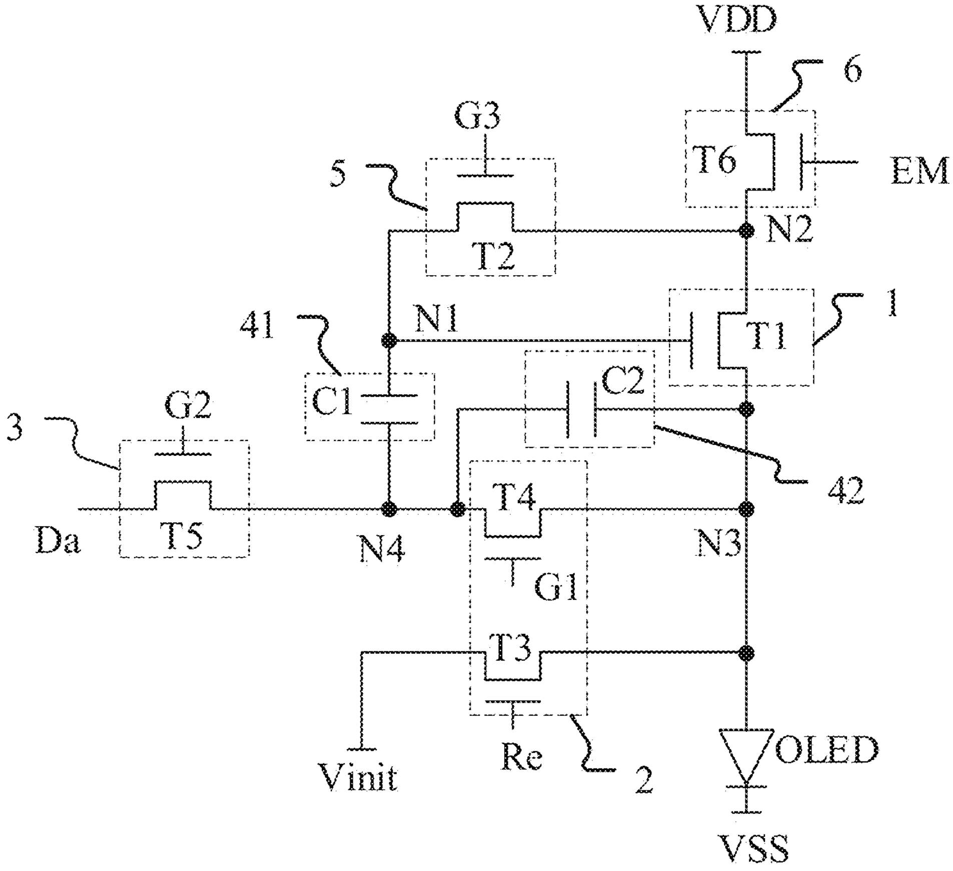
FIG. 2 is a schematic structural diagram of a pixel driving circuit in another exemplary embodiment of the present disclosure.

In the exemplary embodiment, as shown in FIG. 2, a schematic structural diagram of a pixel driving circuit in another exemplary embodiment of the present disclosure is shown. The pixel driving circuit may further include a compensation circuit 5 and a light-emitting control circuit 6. The compensation circuit 5 is connected to the first node N1, the second node N2 and a third gate driving signal end G3, and is configured to connect the first node N1 and the second node N2 in response to a signal of the third gate driving signal end G3. The light-emitting control circuit 6 is connected to a first power supply end VDD, the second node N2 and an enable signal end EM, and is configured to transmit a signal of the first power supply end VDD to the second node N2 in response to a signal of the enable signal end EM.

In the exemplary embodiment, in the reset stage, active levels may be input to the enable signal end EM and the third gate driving signal end G3, the compensation circuit 5 may conduct the first node N1 and the second node N2, and at the same time, the light-emitting control circuit 6 may transmit the signal of the first power supply end VDD to the first node N1, thereby resetting the first node N1. In the threshold compensation stage, inactive levels may be input to the enable signal end EM and the second gate driving signal end G2, active levels may be input to the reset signal end Re, the first gate driving signal end G1 and the third gate driving signal end G3, the reset circuit 2 may transmit the signal of the initial signal end to the third node N3, and the third node N3 may input a threshold compensation voltage Vini+Vth to the first node N1, where Vini is the voltage of the initial signal end Vinit, and Vth is the threshold voltage of the driving transistor T1. In the exemplary embodiment, the pixel driving circuit utilizes the compensation circuit 5 to input the threshold compensation voltage including the threshold voltage of the driving transistor to the first node N1 in the threshold compensation stage. It should be understood that in other exemplary embodiments, the pixel driving circuit may also utilize an external circuit to input the threshold compensation voltage to the first node N1 in the threshold compensation stage.

In the exemplary embodiment, as shown in FIG. 2, the driving circuit 1 may include a driving transistor T1. A first electrode of the driving transistor T1 is connected to the second node N2, a second electrode of the driving transistor T1 is connected to the third node N3, and a gate electrode of the driving transistor T1 is connected to the first node N1, where the driving transistor T1 may be an N-type transistor.

In the exemplary embodiment, as shown in FIG. 2, the compensation circuit 5 may include a second transistor T2. A first electrode of the second transistor T2 is connected to the first node N1, a second electrode of the second transistor T2 is connected to the second node N2, and a gate electrode of the second transistor T2 is connected to the third gate driving signal end G3.

In the exemplary embodiment, as shown in FIG. 2, the reset circuit 2 may include a third transistor T3 and a fourth transistor T4. A first electrode of the third transistor T3 is connected to the initial signal end Vinit, a second electrode of the third transistor T3 is connected to the third node N3, and a gate electrode of the third transistor T3 is connected to the reset signal end Re. A first electrode of the fourth transistor T4 is connected to the third node N3, a second electrode of the fourth transistor T4 is connected to the fourth node N4, and a gate electrode of the fourth transistor T4 is connected to the first gate driving signal end G1.

In the exemplary embodiment, as shown in FIG. 2, the data writing circuit 3 may include a fifth transistor T5. A first electrode of the fifth transistor T5 is connected to the data signal end Da, a second electrode of the fifth transistor T5 is connected to the fourth node N4, and a gate electrode of the fifth transistor T5 is connected to the second gate driving signal end G2.

In the exemplary embodiment, as shown in FIG. 2, the first storage circuit 41 may include a first capacitor C1. A first electrode of the first capacitor C1 is connected to the first node N1, and a second electrode of the first capacitor C1 is connected to the fourth node N4. The second storage circuit 42 may include a second capacitor C2. A first electrode of the second capacitor C2 is connected to the third node N3, and a second electrode of the second capacitor C2 is connected to the fourth node N4.

In the exemplary embodiment, as shown in FIG. 2, the light-emitting control circuit 6 may include a sixth transistor T6. A first electrode of the sixth transistor T6 is connected to the first power supply end VDD, a second electrode of the sixth transistor T6 is connected to the second node N2, and a gate electrode of the sixth transistor T6 is connected to the enable signal end EM.

In the exemplary embodiment, as shown in FIG. 2, the second transistor T2, the third transistor T3, the fourth transistor T4, the fifth transistor T5, and the sixth transistor T6 are N-type transistors. The N-type transistor has a small turn-off leakage current, and thus the pixel driving circuit can reduce the leakage currents of the nodes that pass through the transistors, thereby improving the display effect. In addition, the second transistor T2, the third transistor T3, the fourth transistor T4, the fifth transistor T5, the sixth transistor T6, and the driving transistor T1 are all N-type transistors, and the channel region of the second transistor T2, the channel region of the third transistor T3, the channel region of the fourth transistor T4, the channel region of the fifth transistor T5, the channel region of the sixth transistor T6, and the channel region of the driving transistor T1 may be fabricated on the same active layer, which setting can simplify the fabrication process and structure of the display panel. It should be understood that in other exemplary embodiments, the second transistor T2, the third transistor T3, the fourth transistor T4, the fifth transistor T5, and the sixth transistor T6 may also be P-type transistors.

Figure 3:
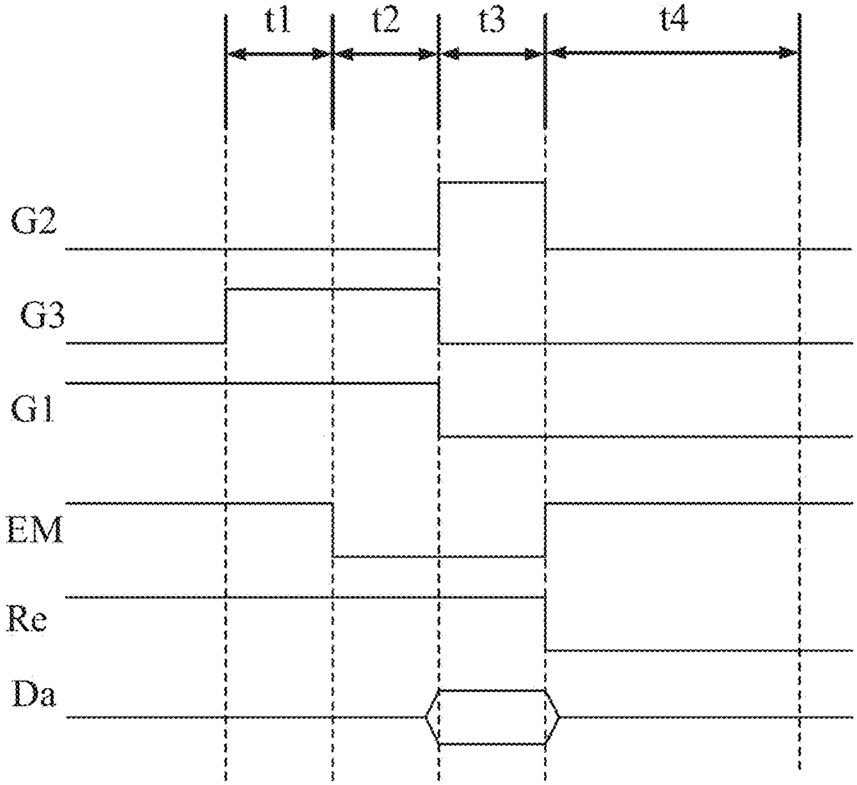
FIG. 3 is a timing diagram of control signals in a driving method for the pixel driving circuit shown in FIG. 2.

As shown in FIG. 3, a timing diagram of control signals in a driving method for the pixel driving circuit shown in FIG. 2 is shown. In this embodiment, G1 represents a timing diagram of a signal on the first gate driving signal end, G2 represents a timing diagram of a signal on the second gate driving signal end, G3 represents a timing diagram of a signal on the third gate driving signal end, EM is a timing diagram of a signal on the enable signal end, Re is a timing diagram of a signal on the reset signal end, and Da is a timing diagram of a signal on the data signal end. In the exemplary embodiments, the first power supply end VDD may be a high level signal end, and the second power supply end VSS may be a low level signal end.

As shown in FIG. 3, the driving method for the pixel driving circuit may include four stages: a reset stage t1, a threshold compensation stage t2, a data writing stage t3, and a light-emitting stage t4.

Figure 4:
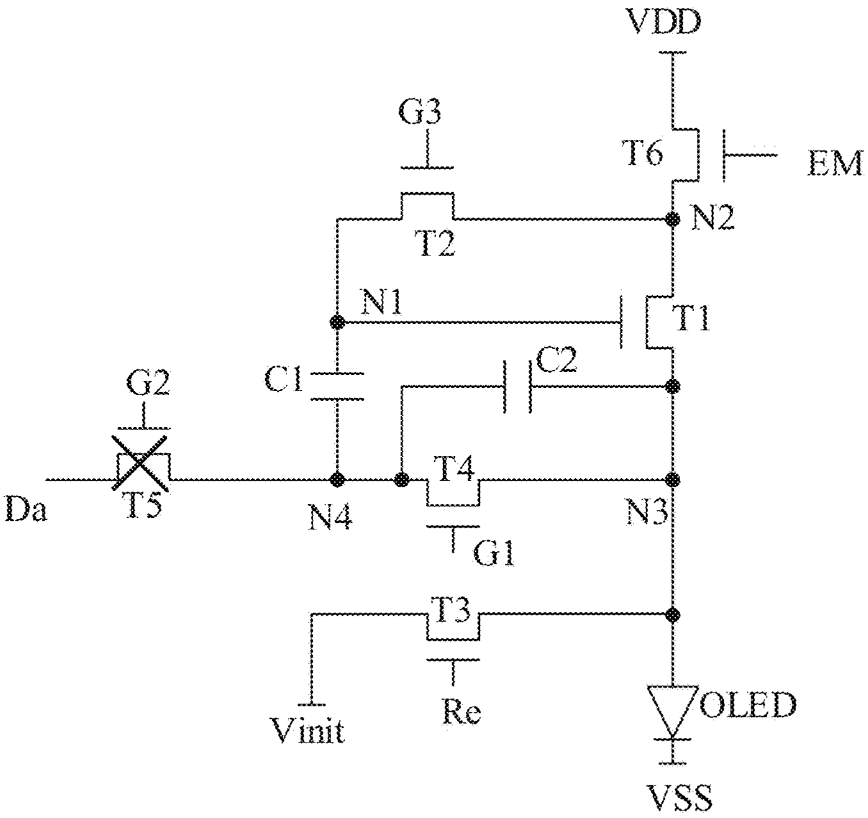
FIG. 4 is a state diagram of the pixel driving circuit shown in FIG. 2 in a reset stage.

In the reset stage t1, high levels may be input to the first gate driving signal end G1, the reset signal end Re, the third gate driving signal end G3, and the enable signal end EM, and a low level may be input to the second gate driving signal end G2. As shown in FIG. 4, a state diagram of the pixel driving circuit shown in FIG. 2 in a reset stage is shown. In this embodiment, the transistor that is marked with a cross is in an off state, and the transistor that is not marked with a cross is in an on state. In the reset stage t1, the initial signal end Vinit inputs an initial voltage Vini to the third node N3 and the fourth node N4, thereby resetting the third node N3 and the fourth node N4. At the same time, the first power supply end VDD inputs a power supply voltage Vdd of the first power supply end VDD to the second node N2 and the first node N1, thereby resetting the second node N2 and the first node N1.

Figure 5:
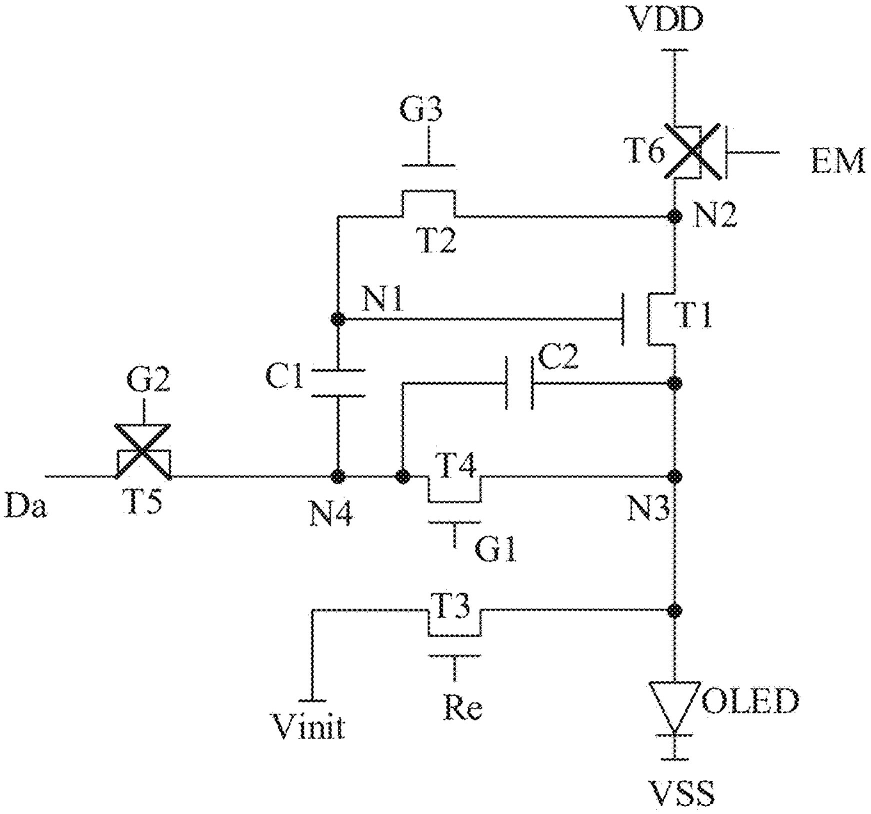
FIG. 5 is a state diagram of the pixel driving circuit shown in FIG. 2 in a threshold compensation stage.

In the threshold compensation stage t2, high levels may be input to the first gate driving signal end G1, the reset signal end Re and the third gate driving signal end G3, and low levels may be input to the second gate driving signal end G2 and the enable signal end EM. As shown in FIG. 5, a state diagram of the pixel driving circuit shown in FIG. 2 in a threshold compensation stage is shown. In this embodiment, the transistor that is marked with a cross is in an off state, and the transistor that is not marked with a cross is in an on state. In the threshold compensation stage t2, the initial signal end Vinit inputs an initial voltage Vini to the third node N3 and the fourth node N4, the driving transistor T1 forms a diode connection structure, the driving transistor T1 is turned on, and the voltage of the first node N1 is gradually lowered until it is lowered to Vini+Vth, where Vth is the threshold voltage of the driving transistor T1.

Figure 6:
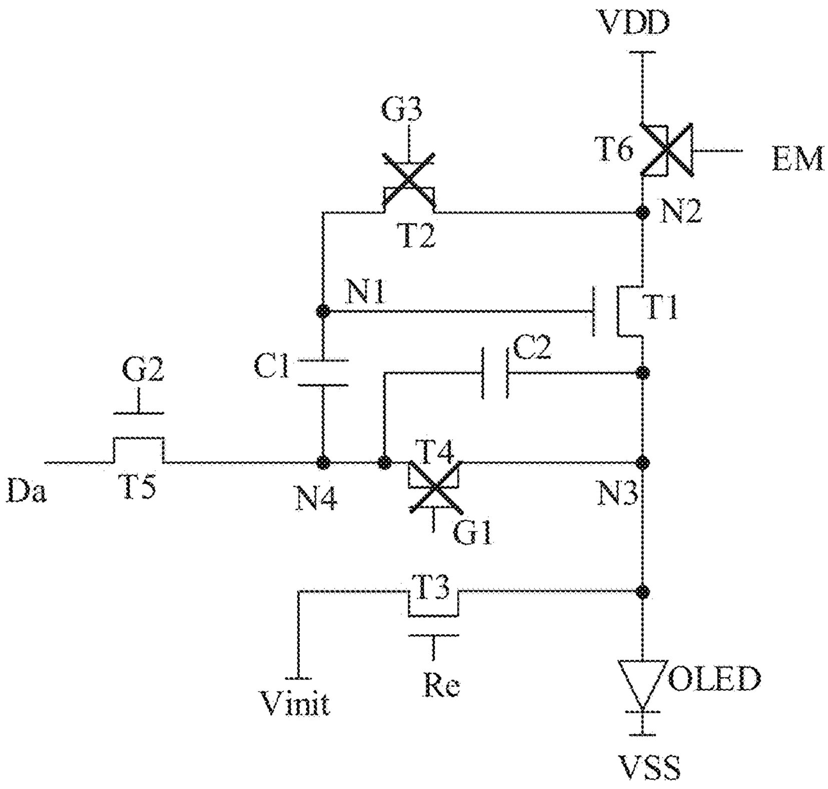
FIG. 6 is a state diagram of the pixel driving circuit shown in FIG. 2 in a data writing stage.

In the data writing stage t3, high levels may be input to the reset signal end Re and the second gate driving signal end G2, low levels may be input to the first gate driving signal end G1, the third gate driving signal end G3 and the enable signal end EM, and at the same time, a data signal may be input to the data signal end Da. As shown in FIG. 6, a state diagram of the pixel driving circuit shown in FIG. 2 in a data writing stage is shown. In this embodiment, the transistor that is marked with a cross is in an off state, and the transistor that is not marked with a cross is in an on state. In the data writing stage t3, the data signal end Da writes a data signal to the fourth node N4, and the voltage of the fourth node N4 changes from Vini to Vdata, where Vdata is the voltage of the data signal. Under the coupling effect of the first capacitor C1, the voltage of the first node N1 is changed to Vini+Vth+Vdata−Vini. At the same time, the initial signal end Vinit inputs an initial voltage Vini to the third node N3.

Figure 7:
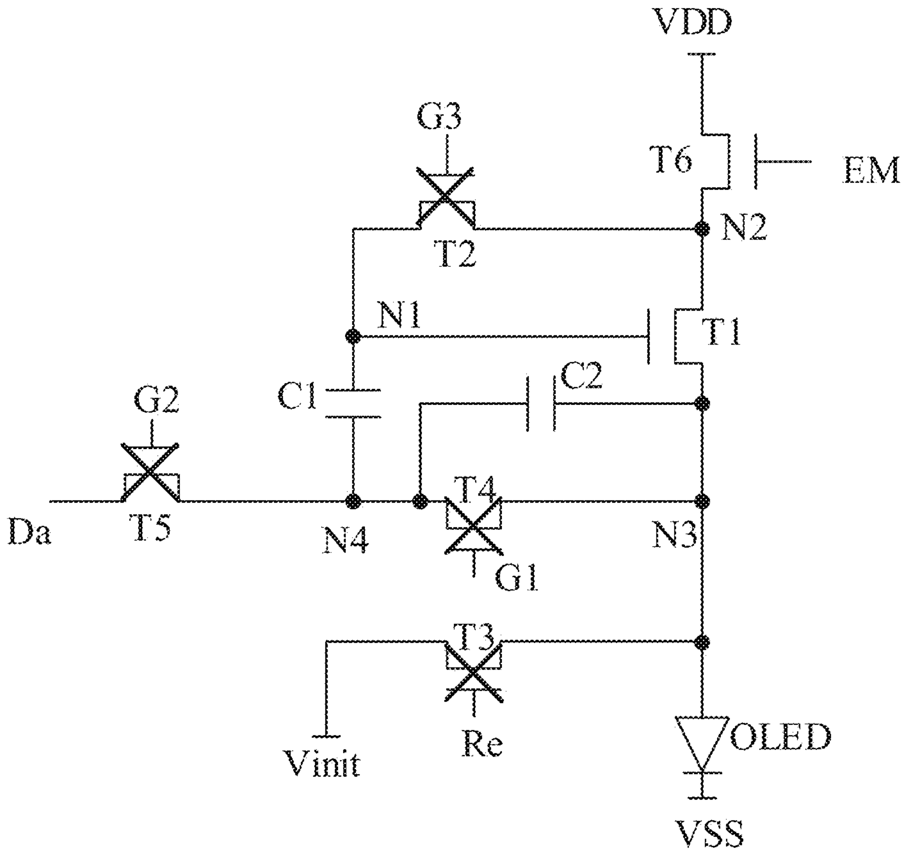
FIG. 7 is a state diagram of the pixel driving circuit shown in FIG. 2 in a light-emitting stage.

In the light-emitting stage t4, a high level may be input to the enable signal end EM, and low levels may be input to the first gate driving signal end G1, the second gate driving signal end G2, the third gate driving signal end G3, and the reset signal end Re. As shown in FIG. 7, a state diagram of the pixel driving circuit shown in FIG. 2 in the light-emitting stage is shown. In this embodiment, the transistor that is marked with a cross is in an off state, and the transistor that is not marked with a cross is in an on state. In the light-emitting phase t4, the driving transistor T1 is turned on, the voltage of the third node is changed from Vini to V3, and under the coupling effect of the first capacitor C1 and the second capacitor C2, the voltage of the first node N1 is changed to Vini+Vth+Vdata−Vini−V3−Vini. In the exemplary embodiment, the output current of the driving transistor T1 to the third node N3 is:

$$\begin{aligned} I &= (\mu WCox/2L)(Vini + Vth + Vdata - Vini + V3 - Vini - V3 - Vth)^2 \\ &= (\mu WCox/2L)(Vdata - Vini)^2 \end{aligned}$$

According to the formula of the output current of the driving transistor T1, it can be seen that the output current of the pixel driving circuit in the exemplary embodiment is independent of the threshold voltage of the driving transistor, and the pixel driving circuit is capable of ameliorating the problem of uneven display of the display panel due to the inconsistency of the threshold voltages of the driving transistors.

The exemplary embodiments also provide a driving method for a pixel driving circuit, the driving method for the pixel driving circuit is used for driving the pixel driving circuit described above, and the driving method for the pixel driving circuit includes:

in a reset stage, inputting active levels to the reset signal end Re and the first gate driving signal end G1, and inputting an inactive level to the second gate driving signal end G2;

in a data writing stage, inputting active levels to the second gate driving signal end G2 and the reset signal end Re, and inputting an inactive level to the first gate driving signal end G1; and in a light-emitting stage, inputting inactive levels to the first gate driving signal end G1, the second gate driving signal end G2 and the reset signal end Re.

The driving method for the pixel driving circuit has been described in detail in the foregoing and will not be repeated herein.

The exemplary embodiments also provide a display panel that may include the pixel driving circuit described above.

The exemplary embodiments also provide a display device that may include the display panel described above. The display device may be a display device such as a cell phone, a tablet computer, a television, and the like.

After considering the specification and practicing the contents disclosed herein, those skilled in the art will easily come up with other embodiments of the present disclosure. The purpose of the present application is to cover any variations, uses or adaptations of the present disclosure, and these variations, uses or adaptations follow the general principles of the present disclosure and include common knowledge or commonly used technical means in the technical field that is not disclosed in the present disclosure. The specification and embodiments are only considered exemplary, and the true scope and spirit of the present disclosure are indicated by the accompanying claims.

After considering the specification and practicing the contents disclosed herein, those skilled in the art will easily come up with other embodiments of the present disclosure. The purpose of the present application is to cover any variations, uses or adaptations of the present disclosure, and these variations, uses or adaptations follow the general principles of the present disclosure and include common knowledge or commonly used technical means in the technical field that is not disclosed in the present disclosure. The specification and embodiments are only considered exemplary, and the true scope and spirit of the present disclosure are indicated by the accompanying claims.

It should be understood that the present disclosure is not limited to the precise structure that has been described above and illustrated in the accompanying drawings, and that various modifications and changes may be made without departing from the scope of the present disclosure. The scope of the present disclosure is limited only by the appended claims.

What is claimed is:

1. A pixel driving circuit, wherein the pixel driving circuit comprises:

a driving circuit, connected to a first node, a second node and a third node, and configured to input, according to a voltage difference between the first node and the third node, a driving current to the third node by using the second node;

a reset circuit, connected to the third node, an initial signal end, a reset signal end, a fourth node, and a first gate driving signal end, wherein the reset circuit is configured to transmit a signal of the initial signal end to the third node in response to a signal of the reset signal end, and configured to connect the third node and the fourth node in response to a signal of the first gate driving signal end;

a data writing circuit, connected to the fourth node, a data signal end and a second gate driving signal end, and configured to transmit a signal of the data signal end to the fourth node in response to a signal of the second gate driving signal end;

a first storage circuit, connected between the first node and the fourth node; and a second storage circuit, connected between the third node and the fourth node.

2. The pixel driving circuit according to claim 1, wherein the pixel driving circuit further comprises:

a compensation circuit, connected to the first node, the second node and a third gate driving signal end, and configured to connect the first node and the second node in response to a signal of the third gate driving signal end; and a light-emitting control circuit, connected to a first power supply end, the second node and an enable signal end, and configured to transmit a signal of the first power supply end to the second node in response to a signal of the enable signal end.

3. The pixel driving circuit according to claim 2, wherein the compensation circuit comprises:

a second transistor, having a first electrode connected to the first node, a second electrode connected to the second node, and a gate electrode connected to the third gate driving signal end.

4. The pixel driving circuit according to claim 2, wherein the light-emitting control circuit comprises:

a sixth transistor, having a first electrode connected to the first power supply end, a second electrode connected to the second node, and a gate electrode connected to the enable signal end.

5. The pixel driving circuit according to claim 2, wherein the driving circuit comprises: a driving transistor, having a first electrode connected to the second node, a second electrode connected to the third node, and a gate electrode connected to the first node;

the compensation circuit comprises: a second transistor, having a first electrode connected to the first node, a second electrode connected to the second node, and a gate electrode connected to the third gate driving signal end;

the reset circuit comprises:

a third transistor, having a first electrode connected to the initial signal end, a second electrode connected to the third node, and a gate electrode connected to the reset signal end; and a fourth transistor, having a first electrode connected to the third node, a second electrode connected to the fourth node, and a gate electrode connected to the first gate driving signal end;

the data writing circuit comprises: a fifth transistor, having a first electrode connected to the data signal end, a second electrode connected to the fourth node, and a gate electrode connected to the second gate driving signal end;

the first storage circuit comprises: a first capacitor, wherein a first electrode of the first capacitor is connected to the first node, and a second electrode of the first capacitor is connected to the fourth node;

the second storage circuit comprises: a second capacitor, wherein a first electrode of the second capacitor is connected to the third node, and a second electrode of the second capacitor is connected to the fourth node;

the light-emitting control circuit comprises: a sixth transistor, having a first electrode connected to the first power supply end, a second electrode connected to the second node, and a gate electrode connected to the enable signal end; and the driving transistor, the second transistor, the third transistor, the fourth transistor, the fifth transistor, and the sixth transistor are N-type transistors.

6. The pixel driving circuit according to claim 1, wherein the driving circuit comprises:

a driving transistor, having a first electrode connected to the second node, a second electrode connected to the third node, and a gate electrode connected to the first node, wherein the driving transistor is an N-type transistor.

7. The pixel driving circuit according to claim 1, wherein the reset circuit comprises:

a third transistor, having a first electrode connected to the initial signal end, a second electrode connected to the third node, and a gate electrode connected to the reset signal end; and a fourth transistor, having a first electrode connected to the third node, a second electrode connected to the fourth node, and a gate electrode connected to the first gate driving signal end.

8. The pixel driving circuit according to claim 1, wherein the data writing circuit comprises:

a fifth transistor, having a first electrode connected to the data signal end, a second electrode connected to the fourth node, and a gate electrode connected to the second gate driving signal end.

9. The pixel driving circuit according to claim 1, wherein the first storage circuit comprises: a first capacitor, wherein a first electrode of the first capacitor is connected to the first node, and a second electrode of the first capacitor is connected to the fourth node; and the second storage circuit comprises: a second capacitor, wherein a first electrode of the second capacitor is connected to the third node, and a second electrode of the second capacitor is connected to the fourth node.

10. A driving method for a pixel driving circuit, wherein the pixel driving circuit comprises:

a driving circuit, connected to a first node, a second node and a third node, and configured to input, according to a voltage difference between the first node and the third node, a driving current to the third node by using the second node;

a reset circuit, connected to the third node, an initial signal end, a reset signal end, a fourth node, and a first gate driving signal end, wherein the reset circuit is configured to transmit a signal of the initial signal end to the third node in response to a signal of the reset signal end, and configured to connect the third node and the fourth node in response to a signal of the first gate driving signal end;

a data writing circuit, connected to the fourth node, a data signal end and a second gate driving signal end, and configured to transmit a signal of the data signal end to the fourth node in response to a signal of the second gate driving signal end;

a first storage circuit, connected between the first node and the fourth node; and a second storage circuit, connected between the third node and the fourth node; and the driving method for the pixel driving circuit comprises:

in a reset stage, inputting an active level to the reset signal end and the first gate driving signal end respectively, and inputting an inactive level to the second gate driving signal end;

in a data writing stage, inputting an active level to the second gate driving signal end and the reset signal end respectively, and inputting an inactive level to the first gate driving signal end; and in a light-emitting stage, inputting an inactive level to the first gate driving signal end, the second gate driving signal end and the reset signal end respectively.

11. A display panel, comprising a pixel driving circuit, wherein the pixel driving circuit comprises:

a driving circuit, connected to a first node, a second node and a third node, and configured to input, according to a voltage difference between the first node and the third node, a driving current to the third node by using the second node;

a reset circuit, connected to the third node, an initial signal end, a reset signal end, a fourth node, and a first gate driving signal end, wherein the reset circuit is configured to transmit a signal of the initial signal end to the third node in response to a signal of the reset signal end, and configured to connect the third node and the fourth node in response to a signal of the first gate driving signal end;

a data writing circuit, connected to the fourth node, a data signal end and a second gate driving signal end, and configured to transmit a signal of the data signal end to the fourth node in response to a signal of the second gate driving signal end;

a first storage circuit, connected between the first node and the fourth node; and a second storage circuit, connected between the third node and the fourth node.

12. A display device, comprising the display panel according to claim 11.

13. The display panel according to claim 11, wherein the pixel driving circuit further comprises:

a compensation circuit, connected to the first node, the second node and a third gate driving signal end, and configured to connect the first node and the second node in response to a signal of the third gate driving signal end; and a light-emitting control circuit, connected to a first power supply end, the second node and an enable signal end, and configured to transmit a signal of the first power supply end to the second node in response to a signal of the enable signal end.

14. The display panel according to claim 13, wherein the compensation circuit comprises:

a second transistor, having a first electrode connected to the first node, a second electrode connected to the second node, and a gate electrode connected to the third gate driving signal end.

15. The display panel according to claim 13, wherein the light-emitting control circuit comprises:

a sixth transistor, having a first electrode connected to the first power supply end, a second electrode connected to the second node, and a gate electrode connected to the enable signal end.

16. The display panel according to claim 13, wherein the driving circuit comprises: a driving transistor, having a first electrode connected to the second node, a second electrode connected to the third node, and a gate electrode connected to the first node;

the compensation circuit comprises: a second transistor, having a first electrode connected to the first node, a second electrode connected to the second node, and a gate electrode connected to the third gate driving signal end;

the reset circuit comprises:

a third transistor, having a first electrode connected to the initial signal end, a second electrode connected to the third node, and a gate electrode connected to the reset signal end; and a fourth transistor, having a first electrode connected to the third node, a second electrode connected to the fourth node, and a gate electrode connected to the first gate driving signal end;

the data writing circuit comprises: a fifth transistor, having a first electrode connected to the data signal end, a second electrode connected to the fourth node, and a gate electrode connected to the second gate driving signal end;

the first storage circuit comprises: a first capacitor, wherein a first electrode of the first capacitor is connected to the first node, and a second electrode of the first capacitor is connected to the fourth node;

the second storage circuit comprises: a second capacitor, wherein a first electrode of the second capacitor is connected to the third node, and a second electrode of the second capacitor is connected to the fourth node;

the light-emitting control circuit comprises: a sixth transistor, having a first electrode connected to the first power supply end, a second electrode connected to the second node, and a gate electrode connected to the enable signal end; and the driving transistor, the second transistor, the third transistor, the fourth transistor, the fifth transistor, and the sixth transistor are N-type transistors.

17. The display panel according to claim 11, wherein the driving circuit comprises:

a driving transistor, having a first electrode connected to the second node, a second electrode connected to the third node, and a gate electrode connected to the first node, wherein the driving transistor is an N-type transistor.

18. The display panel according to claim 11, wherein the reset circuit comprises:

a third transistor, having a first electrode connected to the initial signal end, a second electrode connected to the third node, and a gate electrode connected to the reset signal end; and a fourth transistor, having a first electrode connected to the third node, a second electrode connected to the fourth node, and a gate electrode connected to the first gate driving signal end.

19. The display panel according to claim 11, wherein the data writing circuit comprises:

a fifth transistor, having a first electrode connected to the data signal end, a second electrode connected to the fourth node, and a gate electrode connected to the second gate driving signal end.

20. The display panel according to claim 11, wherein the first storage circuit comprises: a first capacitor, wherein a first electrode of the first capacitor is connected to the first node, and a second electrode of the first capacitor is connected to the fourth node; and the second storage circuit comprises: a second capacitor, wherein a first electrode of the second capacitor is connected to the third node, and a second electrode of the second capacitor is connected to the fourth node.

* * * * *